United States Patent
Jain

(10) Patent No.: US 8,745,746 B1
(45) Date of Patent: Jun. 3, 2014

(54) SYSTEMS AND METHODS FOR ADDRESSING SECURITY VULNERABILITIES ON COMPUTING DEVICES

(75) Inventor: Akshat Jain, Rajasthan (IN)

(73) Assignee: Symantec Corporation, Mountain View, CA (US)

( * ) Notice: Subject to any disclaimer, the term of this patent is extended or adjusted under 35 U.S.C. 154(b) by 141 days.

(21) Appl. No.: 13/414,408

(22) Filed: Mar. 7, 2012

(51) Int. Cl.
*G06F 11/00* (2006.01)

(52) U.S. Cl.
USPC .......................................................... 726/25

(58) Field of Classification Search
USPC ................................... 726/1, 22–26; 709/224
See application file for complete search history.

(56) References Cited

U.S. PATENT DOCUMENTS

2011/0047594 A1* 2/2011 Mahaffey et al. ................. 726/1
2012/0110174 A1* 5/2012 Wootton et al. ............... 709/224
2013/0067577 A1* 3/2013 Turbin et al. .................... 726/24

OTHER PUBLICATIONS

Robert Vamosi; Mobile Industry Slow to Push Android Updates to Users; SecurityWeek Internet and Enterprise Security News, Insights & Analysis; Sep. 15, 2011.

* cited by examiner

*Primary Examiner* — Beemnet Dada
(74) *Attorney, Agent, or Firm* — ALG Intellectual Property, LLC

(57) ABSTRACT

A computer-implemented method for addressing security vulnerabilities on computing devices may include 1) identifying a security vulnerability associated with a programmatic installation on a mobile computing platform, 2) querying, in response to identifying the security vulnerability, a database for a list of mobile computing devices that include both the programmatic installation and a security system capable of remedying security vulnerabilities, 3) generating a message to send to each mobile computing device within the list of mobile computing devices that includes a prompt to remedy the security vulnerability, and 4) prompting a user of each mobile computing device within the list of mobile computing devices to remedy the security vulnerability by transmitting the message to each mobile computing device within the list of mobile computing devices via a plurality of push notifications. Various other methods, systems, and computer-readable media are also disclosed.

20 Claims, 6 Drawing Sheets

SYSTEMS AND METHODS FOR ADDRESSING SECURITY VULNERABILITIES ON COMPUTING DEVICES

BACKGROUND

Mobile computing devices such as cellular telephones, tablet computers, e-book readers, and the like have become a ubiquitous part of everyday life, enabling consumers to access the Internet from almost anywhere. Unfortunately, the ability to access the Internet from these devices also exposes such devices to the various dangers of the Internet. For example, malicious web pages may exploit vulnerabilities in the web browsing software of mobile computing devices in order to deliver malware to such devices. Similarly, users may unknowingly download malicious applications to their mobile computing devices from untrusted or even trusted sources, such as digital distribution platforms (or "application stores"), which may sometimes inadvertently host malware.

Many computer security solution providers offer system-level software, such as anti-virus software, that monitors computing activity and blocks, quarantines, and/or eradicates the various threats that a computing system may be exposed to via the Internet. However, because mobile computing devices may rely on data transfer methods that are expensive, resource-intensive, and/or limited, mobile computing security systems may only update anti-malware definitions infrequently and/or irregularly, potentially leaving mobile computing devices exposed to known threats. Accordingly, the instant disclosure identifies a need for additional and improved systems and methods for addressing security vulnerabilities on mobile computing devices.

SUMMARY

As will be described in greater detail below, the instant disclosure describes various exemplary systems and methods that enable users to quickly protect their mobile computing devices from security vulnerabilities without requiring frequent and/or regular security definition updates. In one example, a computer-implemented method for performing such a task may include 1) identifying a security vulnerability associated with a programmatic installation on a mobile computing platform, 2) querying, in response to identifying the security vulnerability, a database for a list of mobile computing devices that include both the programmatic installation and a security system capable of remedying security vulnerabilities, 3) generating a message to send to each mobile computing device within the list of mobile computing devices that includes a prompt to remedy the security vulnerability, and 4) prompting a user of each mobile computing device within the list of mobile computing devices to remedy the security vulnerability by transmitting the message to each mobile computing device within the list of mobile computing devices via a plurality of push notifications.

In some examples, identifying the security vulnerability may include identifying malware within an application designed for a mobile computing platform. In these examples, querying the database may include querying the database for a list of mobile computing devices with the application installed. Additionally or alternatively, in some examples identifying the security vulnerability may include identifying an exploit within a firmware of the mobile computing platform. In these examples, querying the database may include querying the database for a list of mobile computing devices with the firmware installed. In one example, identifying the security vulnerability may include receiving an alert from an affected mobile computing device that detected the security vulnerability associated with the programmatic installation.

The database may include any of a variety of information. For example, the database may include information identifying a plurality of applications from a plurality of vendors installed on a plurality of mobile computing devices. Generating the message may include any of a variety of messages. For example, where the security vulnerability includes malware within an application, generating the message may include 1) generating a message that prompts the user to download a malware definition for identifying the malware within the application and/or 2) generating a message that prompts the user to uninstall the application. Where the security vulnerability includes an exploit within firmware, generating the message may include generating a message prompting a user to upgrade the firmware to a secure version of the firmware.

In one embodiment, a system for implementing the above-described method may include 1) an identification module programmed to identify a security vulnerability associated with a programmatic installation on a mobile computing platform, 2) a query module programmed to query, in response to identifying the security vulnerability, a database for a list of mobile computing devices that include both the programmatic installation and a security system capable of remedying security vulnerabilities, 3) a generation module programmed to generate a message to send to each mobile computing device within the list of mobile computing devices that includes a prompt to remedy the security vulnerability, and 4) a prompting module programmed to prompt a user of each mobile computing device within the list of mobile computing devices to remedy the security vulnerability by transmitting the message to each mobile computing device within the list of mobile computing devices via a plurality of push notifications. The system may also include at least one processor configured to execute the identification module, the query module, the generation module, and the prompting module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a security vulnerability associated with a programmatic installation on a mobile computing platform, 2) query, in response to identifying the security vulnerability, a database for a list of mobile computing devices that include both the programmatic installation and a security system capable of remedying security vulnerabilities, 3) generate a message to send to each mobile computing device within the list of mobile computing devices that includes prompt to remedy the security vulnerability, and 4) prompt a user of each mobile computing device within the list of mobile computing devices to remedy the security vulnerability by transmitting the message to each mobile computing device within the list of mobile computing devices via a plurality of push notifications.

As will be explained in greater detail below, by identifying security vulnerabilities on mobile computing platforms and then sending push notifications to mobile computing devices that are exposed to such vulnerabilities, the systems and methods described herein may enable users to quickly protect their mobile computing devices without requiring frequent and/or regular security definition updates. In some examples, these systems and methods may also enable users to quickly protect their mobile computing devices even without an active data plan.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
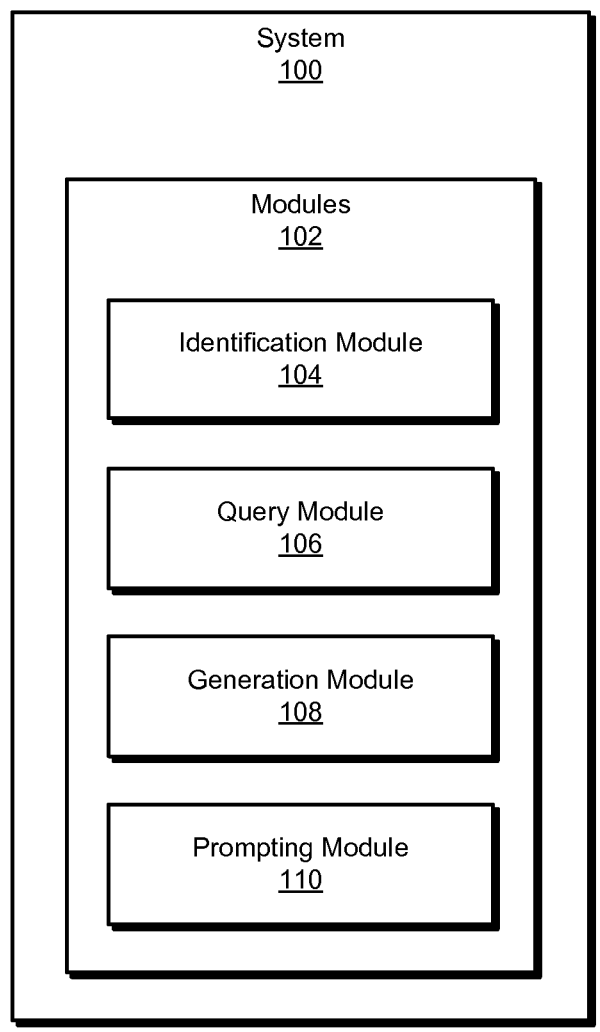
FIG. 1 is a block diagram of an exemplary system for addressing security vulnerabilities on computing devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
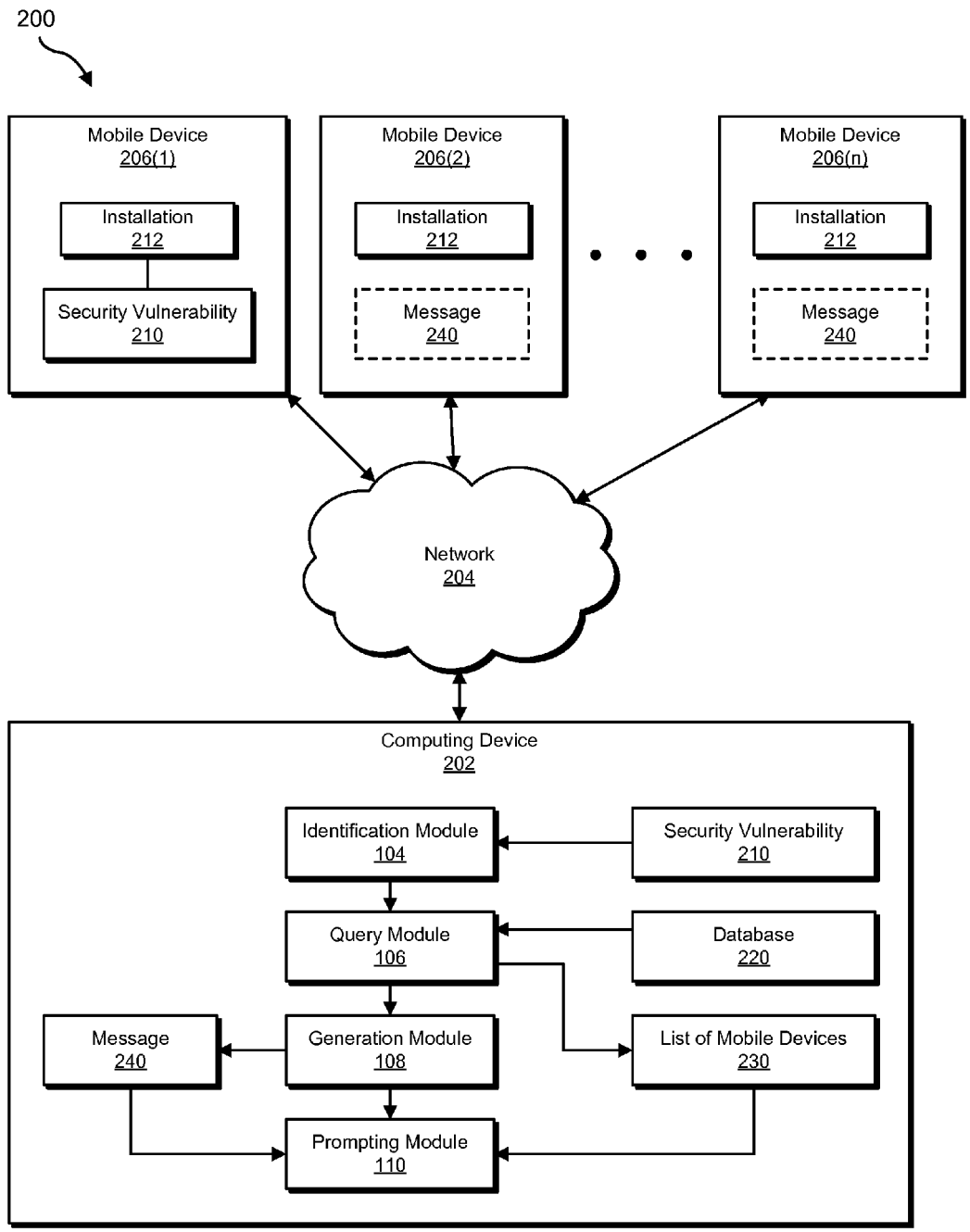
FIG. 2 is a block diagram of an exemplary system for addressing security vulnerabilities on computing devices.
Figure 3:
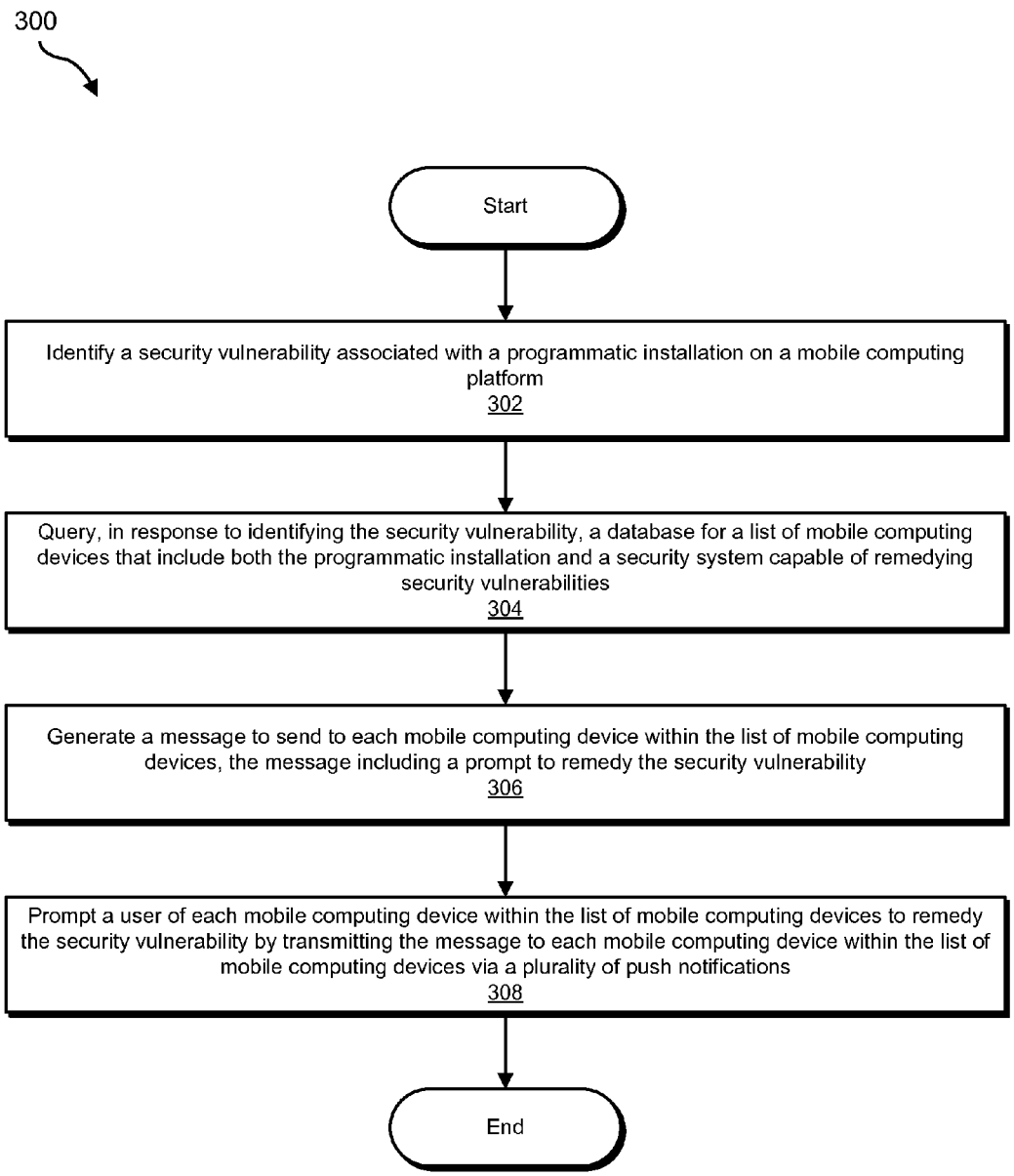
FIG. 3 is a flow diagram of an exemplary method for addressing security vulnerabilities on computing devices.
Figure 4:
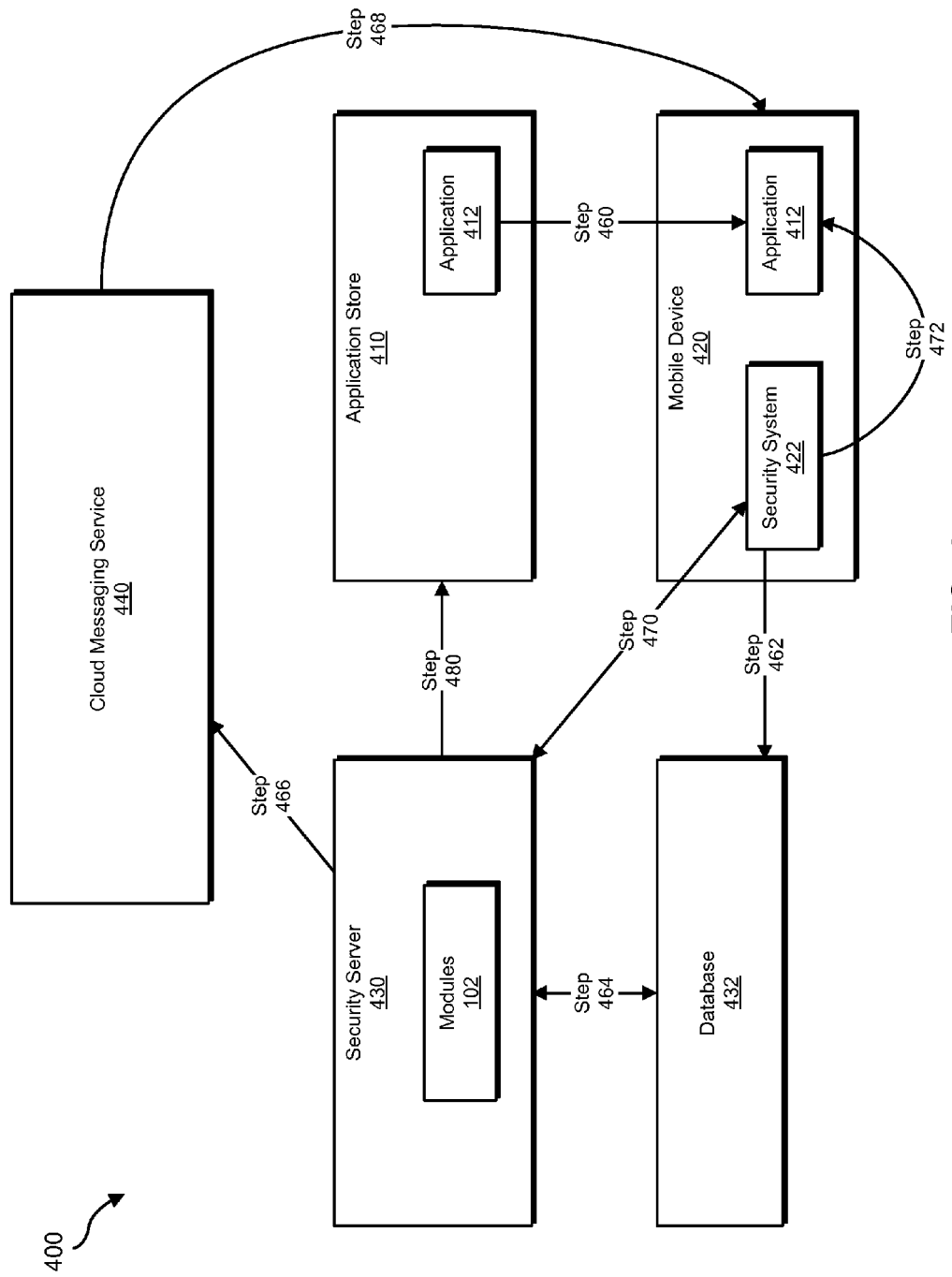
FIG. 4 is a block diagram of an exemplary system for addressing security vulnerabilities on computing devices.

The following will provide, with reference to FIGS. 1, 2, and 4, detailed descriptions of exemplary systems for addressing security vulnerabilities on computing devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for addressing security vulnerabilities on computing devices. As illustrated in this figure, exemplary system 100 may include one or more modules 102 for performing one or more tasks. For example, and as will be explained in greater detail below, exemplary system 100 may include an identification module 104 programmed to identify a security vulnerability associated with a programmatic installation on a mobile computing platform. Exemplary system 100 may also include a query module 106 programmed to query, in response to identifying the security vulnerability, a database for a list of mobile computing devices that include both the programmatic installation and a security system capable of remedying security vulnerabilities.

In addition, and as will be described in greater detail below, exemplary system 100 may include a generation module 108 programmed to generate a message to send to each mobile computing device within the list of mobile computing devices that includes a prompt to remedy the security vulnerability. Exemplary system 100 may also include a prompting module 110 programmed to prompt a user of each mobile computing device within the list of mobile computing devices to remedy the security vulnerability by transmitting the message to each mobile computing device within the list of mobile computing devices via a plurality of push notifications. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or mobile devices 206(1)-(n)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with mobile devices 206(1)-(n) via a network 204, e.g., to alert one or more of mobile devices 206(1)-(n) of security vulnerabilities.

In one embodiment, one or more of modules 102 from FIG. 1 may, when executed by at least one processor of computing device 202, enable computing device 202 to address security vulnerabilities on mobile computing devices. For example, and as will be described in greater detail below, one or more of modules 102 may cause computing device 202 to 1) identify a security vulnerability 210 associated with an installation 212 on a mobile computing platform (e.g., mobile device 206(1)), 2) query, in response to identifying security vulnerability 210, a database 220 for a list of mobile devices 230 that include both installation 212 and a security system capable of remedying security vulnerabilities, 3) generate a message 240 to send to each mobile computing device within the list of mobile computing devices 230 that includes a prompt to remedy security vulnerability 210, and 4) prompt a user of each mobile computing device within the list of mobile computing devices 230 to remedy security vulnerability 210 by transmitting message 240 to each mobile computing device within the list of mobile computing devices 230 via a plurality of push notifications.

Computing device 202 generally represents any type or form of computing device capable of reading computer-executable instructions. Examples of computing device 202 include, without limitation, desktops, servers, laptops, tablets, cellular phones, personal digital assistants (PDAs), multimedia players, embedded systems, combinations of one or more of the same, exemplary computing system 510 in FIG. 5, or any other suitable computing device.

Database 220 may represent portions of a single database or computing device or a plurality of databases or computing devices. For example, database 220 may represent a portion of computing device 202 in FIG. 2, computing system 510 in FIG. 5, and/or portions of exemplary network architecture 600 in FIG. 6. Alternatively, database 220 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Mobile devices 206(1)-(n) generally represent any type or form of computing device capable of reading computer-executable instructions. Examples of computing device 202 include, without limitation, cellular phones, tablets, personal digital assistants (PDAs), multimedia players, laptops, set-top boxes, desktops, servers, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and mobile devices 206(1)-(n).

FIG. 3 is a flow diagram of an exemplary computer-implemented method 300 for addressing security vulnerabilities on computing devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a security vulnerability associated with a programmatic installation on a mobile computing platform. For example, at step 302 identification module 104 may, as part of computing device 202 in FIG. 2, identify security vulnerability 210 associated with installation 212 on a mobile computing platform (e.g., mobile device 206(1)).

As used herein, the phrase "mobile computing platform" may refer to any computing device, software framework, and/or combination thereof. As previously noted, a mobile computing platform may include a mobile phone, a tablet computer, an e-book reader, a personal digital assistant, and the like. The phrase "mobile computing platform" may also generally refer to any other portable device that may have wireless connectivity to the Internet. Mobile computing platforms may include GPS devices, messaging devices, and various other types of mobile devices.

In some examples, the mobile computing platform may include a restricted platform that may interfere with some traditional methods for computing security. For example, the mobile computing platform may restrict modifications to system-level and/or base functionality. In some examples, the restricted mobile platform may limit the ability of third-party software to inspect the behavior of other applications, such as network traffic, file creation and/or modification, resource usage, and/or execution context. The restricted mobile platform may enforce these limitations as a part of the hardware of mobile computing system and/or as a part of the operating system of the mobile computing device. In some examples, the restricted mobile platform may extend to an application store with exclusive privileges to allow certain configurations and/or software installations on the mobile computing system. In some examples, restrictions on the mobile platform may be enforced by decisions regarding whether to make an application available and/or visible in the application store. In some examples, restrictions on the mobile platform may hamper the use of third-party security software on the mobile platform by making use of the third-party security software difficult and/or costly, and/or by reducing features and/or the reliability of the mobile platform when third-party security software is installed.

In various examples, the mobile computing platform may include limited computing resources such that performing security services on the mobile computing platform such as updating anti-malware definitions may degrade the performance of the mobile computing platform and/or consume limited allocated resources. For example, the mobile computing platform may include limited network bandwidth, a data plan with data caps, limited processing power, limited volatile memory, and/or limited battery power.

As used herein, the phrase "programmatic installation" may refer to any software and/or firmware installed on, used by, and/or available to a mobile computing platform. For example, the programmatic installation may include an application. As used herein, the term "application" may refer to any file capable that includes and/or may be used to generate one or more computer-executable instructions. Examples of applications may include, without limitation, executable files, library files, data files configured to exploit a program when read and/or interpreted, archive files (e.g., application packages and/or compression files) including a representation of one or more files, plug-in files, and script files.

As used herein, the phrase "security vulnerability" may refer to any of a variety of vulnerabilities that may compromise the security of a computing device. For example, the phrase "security vulnerability" may refer to malware. Additionally or alternatively, the phrase "security vulnerability" may refer to an error, unintended behavior, unintended state, and/or backdoor that may enable and/or facilitate an exploit and/or attack.

Identification module 104 may identify the security vulnerability in any suitable context. For example, identification module 104 may identify malware within an application for mobile computing platforms. As used herein, the term "malware" may refer to any virus, worm, Trojan horse, spyware, and/or any other malicious, illegitimate, and/or unauthorized software. For example, identification module 104 may receive a message identifying malware within the application. Additionally or alternatively, identification module 104 may receive input from a security engineer identifying malware within the application. In some examples, identification module 104 may scan the application for malware and/or receive the results of an anti-malware scan of the application. In at least one example, identification module 104 may receive a message from a security system on a mobile computing device with the application indicating that the security system has detected malware within the application.

In an additional example, identification module 104 may identify the security vulnerability by identifying an exploit within firmware of the mobile computing platform. For example, the firmware may, when installed on a mobile computing platform, facilitate an attack to gained unauthorized access to one or more permissions, functions, and/or data objects of the mobile computing platform. For example, identification module 104 may receive a message identifying the exploit within the firmware. Additionally or alternatively, identification module 104 may receive input from a security engineer identifying the exploit within the firmware. In some examples, identification module 104 may scan the firmware for potential exploits and/or receive the results of a security analysis of the firmware. In at least one example, identification module 104 may receive a message from a security system on a mobile computing device with the application indicating that the security system has detected an exploit (e.g., by identifying an attack in progress) within the firmware.

In some examples, identification module 104 may identify the security vulnerability by receiving an alert from an affected mobile computing device that detected the security vulnerability associated with the programmatic installation. For example, as mentioned above identification module 104 may receive an alert from a mobile computing device that has detected malware within an application and/or an exploit within an application and/or firmware on the affected mobile computing device. Accordingly, identification module 104 may receive an identifier of the application, and/or an identifier of the firmware, operating system, make and/or model of the mobile computing device, and/or any other relevant information to identifying the programmatic installation and/or the security vulnerability.

FIG. 4 illustrates an exemplary system 400 for addressing security vulnerabilities on computing devices. As shown in FIG. 4, exemplary system 400 may include an application store 410, a mobile device 420, a security server 430, a database 432, and a cloud messaging service 440. At step 460, mobile device 420 may install an application 412 from application store 410 to mobile device 420. Security system 422 may then, at step 462, register the installation of application 412 on mobile device 420 with database 432. Identification module 104 may then, as a part of modules 102 on security server 430, identify a security vulnerability with application 412.

Returning to FIG. 3, at step 304 one or more of the systems described herein may query, in response to identifying the security vulnerability, a database for a list of mobile computing devices that include both the programmatic installation and a security system capable of remedying security vulnerabilities. For example, at step 304 query module 106 may, as part of computing device 202 in FIG. 2, query, in response to identifying security vulnerability 210, database 220 for the list of mobile devices 230 that include both installation 212 and a security system capable of remedying security vulnerabilities.

As used herein, the term "database" may refer to any system and/or data structure for storing and/or associating data. In some examples, the database may include information identifying a plurality of applications from a plurality of vendors installed on a plurality of mobile computing devices. For example, each mobile computing device within the plurality of mobile computing devices may have registered for inclusion on a security vulnerability watch list, whereby each mobile computing device may register installed applications, firmware version information, and/or other relevant information within the database. As used herein, the term "vendor" may refer to any distinct entity designated as a creator, publisher, and/or distributor of an application. In some examples, none the plurality of vendors may own and/or control and/or be owned and/or controlled by an entity that owns and/or controls the database. Accordingly, the systems and methods described herein may gather and use information about applications with potential security vulnerabilities that are controlled by third-party vendors.

As used herein, the phrase "security system" may refer to any system, software, and/or module for identifying, remedying, and/or warning about security vulnerabilities. For example, the security system may include an anti-malware scanning system, an application registration system, and/or a system for receiving and/or displaying alerts about security vulnerabilities in applications and/or firmware.

Querying module 106 may query the database for any suitable information. For example, as mentioned earlier, in some examples the security vulnerability may relate to an application. Accordingly, querying module 106 may query the database for a list of mobile computing devices with the application installed. As another example, as mentioned earlier, in some examples the security vulnerability may relate to firmware. Accordingly, querying module 106 may query the database for a list of mobile computing devices with the firmware installed. Additionally, querying module 106 may use any other criteria and/or filters for generating the list of mobile computing devices to determine which mobile computing devices are vulnerable and/or configured to receive messages about security vulnerabilities.

Using FIG. 4 as an example, at step 464 querying module 106 may, as a part of modules 102 on security 430 query database 432 for a list of mobile computing devices with application 412 installed (and, e.g., receive the list of mobile computing devices).

Returning to FIG. 3, at step 306 one or more of the systems described herein may generate a message to send to each mobile computing device within the list of mobile computing devices, the message including a prompt to remedy the security vulnerability. For example, at step 306 generation module 108 may, as part of computing device 202 in FIG. 2, generate message 240 to send to each mobile computing device within the list of mobile computing devices 230, message 240 including a prompt to remedy security vulnerability 210.

Generation module 108 may generate the message in any suitable manner. In some examples, generation module 108 may generate the message by identifying a pre-defined message relating to the security vulnerability. Additionally or alternatively, generation module 108 may insert an identifier of a vulnerable application and/or firmware into the message. In some examples, generation module 108 may generate the message by copying the message, formatting the message, and/or preparing the message for transmission.

The message may include any of a variety of information. As mentioned earlier, in some examples, the security vulnerability may include malware within an application. In these examples, generation module 108 may generate a message that prompts the user to download a malware definition for identifying the malware within the application. For example, generation module 108 may generate the message that prompts the user to update the latest malware definition package from a security vendor. Additionally or alternatively, generation module 108 may generate a message that prompts the user to uninstall the application. In some examples, generation module 108 may generate a message that prompts the user to close the application and/or remove permissions from the application. Additionally, in some examples, the security vulnerability may be associated with firmware on a mobile computing device. Accordingly, generation module 108 may generate a message prompting a user to upgrade the firmware to a secure version of the firmware.

Generally, generation module 108 may generate any message prompting a user to take action to address the security vulnerability. In some examples, as will be described in greater detail below, generation module 108 may generate a message below a predetermined size threshold.

Returning to FIG. 3, at step 308 one or more of the systems described herein may prompt a user of each mobile computing device within the list of mobile computing devices to remedy the security vulnerability by transmitting the message to each mobile computing device within the list of mobile computing devices via a plurality of push notifications. For example, at step 308 prompting module 110 may, as part of computing device 202 in FIG. 2, prompt a user of each mobile computing device within the list of mobile computing devices 230 to remedy security vulnerability 210 by transmitting message 240 to each mobile computing device within the list of mobile computing devices 230 via a plurality of push notifications.

As used herein, the phrase "push notification" may refer to any server-initiated notification and/or message sent to a mobile computing device. For example, the phrase "push notification" may refer to a notification sent via the APPLE PUSH NOTIFICATION SERVICE, to a message sent via the ANDROID CLOUD TO DEVICE MESSAGING SERVICE ("C2DM"), and/or to a notification sent via the MICROSOFT PUSH NOTIFICATION SERVICE ("MPNS"). In some examples, the phrase "push notification" may refer to a notification about the existence of new data (e.g., but not containing the new data). For example, the push notification may notify of the existence of an anti-malware definition without including the anti-malware definition and/or a secure version of a firmware without including the firmware update. In some examples, the push notification may be limited by size. For example, the push notification may include a message limited to be 1024 bytes or fewer. In at least one example, the phrase "push notification" may refer to a data message that may be received by a mobile computing device via a wireless carrier without an active data plan (e.g., a subscription with the wireless carrier to send and/or receive Internet data).

Prompting module 110 may transmit the message via the plurality of push notifications in any of a variety of ways. For example, prompting module 110 may transmit the message directly to the mobile computing devices within the list of mobile computing devices. Additionally or alternatively, prompting module 110 may transmit the message to a service configured to forward the message to each mobile computing device within the list of mobile computing devices using a plurality of push notifications. In some examples, prompting module 110 may configure the plurality of push notifications to be received (and, e.g., displayed) by the security system installed on each mobile computing device.

Using FIG. 4 as an example, at step 466 prompting module 110 may, as a part of modules 102 on security server 430, transmit the message to cloud messaging service 440. At step 468, cloud messaging service 440 may transmit the message, via push notification, to each mobile device within the list of mobile computing devices, including mobile device 420. Accordingly, a user of mobile device 420 may see the message (e.g., prompting the user to update anti-malware definitions used by security system 422). The user of mobile device 420 may then initiate, at step 470, an update of anti-malware definitions for security system 422. Security system 422 may then, at step 472, identify malware within application 412 and repair, quarantine, and/or delete application 412 on mobile computing device 420. Additionally, in some examples, at step 480 prompting module 110 may, as a part of modules 102 on security server 430, send an alert to application store 410 that application 412 is malicious and/or remove application 412 from application store 410.

As explained above, by identifying security vulnerabilities on mobile computing platforms and then sending push notifications to mobile computing devices that are exposed to such vulnerabilities, the systems and methods described herein may enable users to quickly protect their mobile computing devices without requiring frequent and/or regular security definition updates. In some examples, these systems and methods may also enable users to quickly protect their mobile computing devices even without an active data plan.

Figure 5:
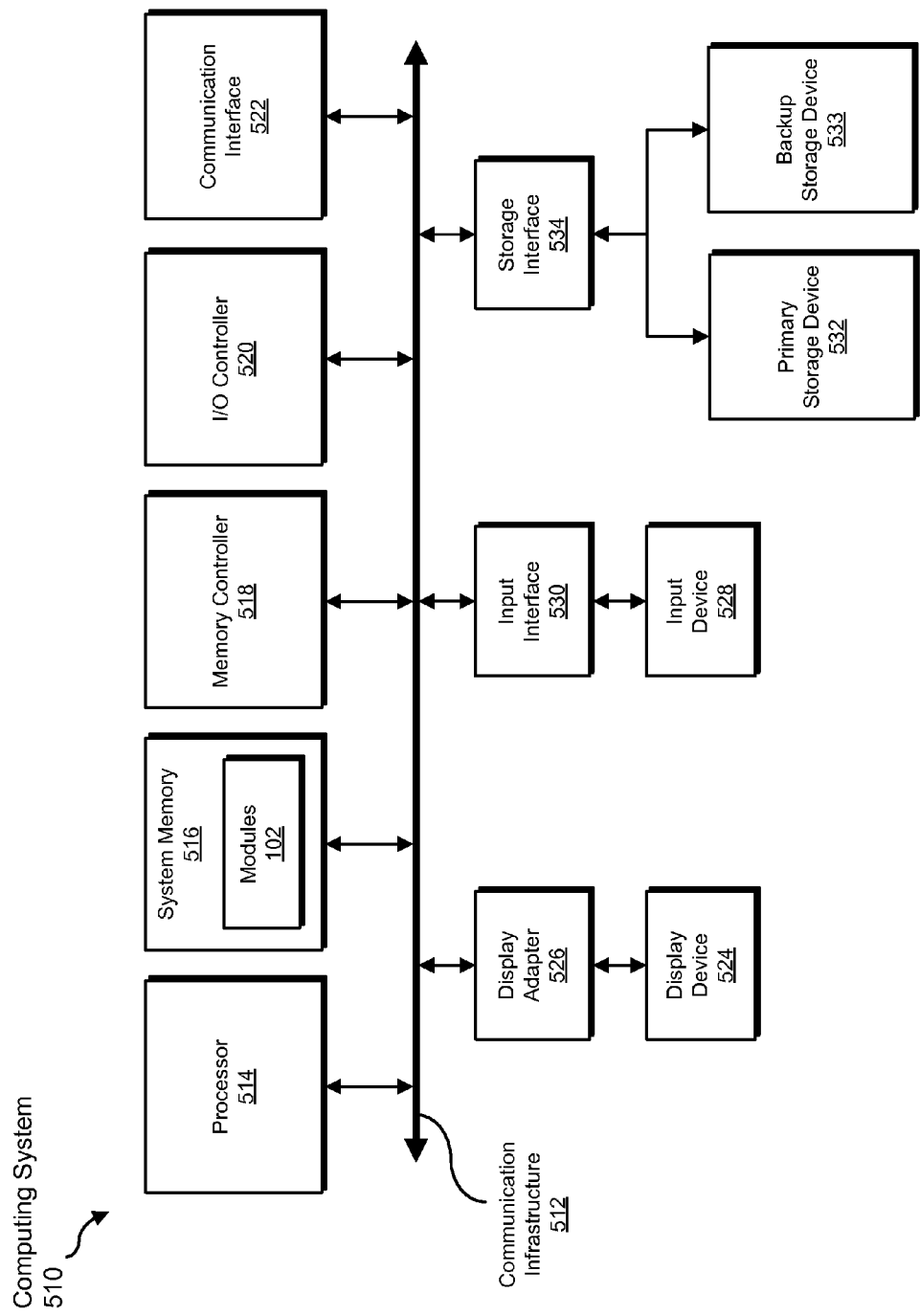
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, querying, generating, prompting, receiving, and transmitting steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
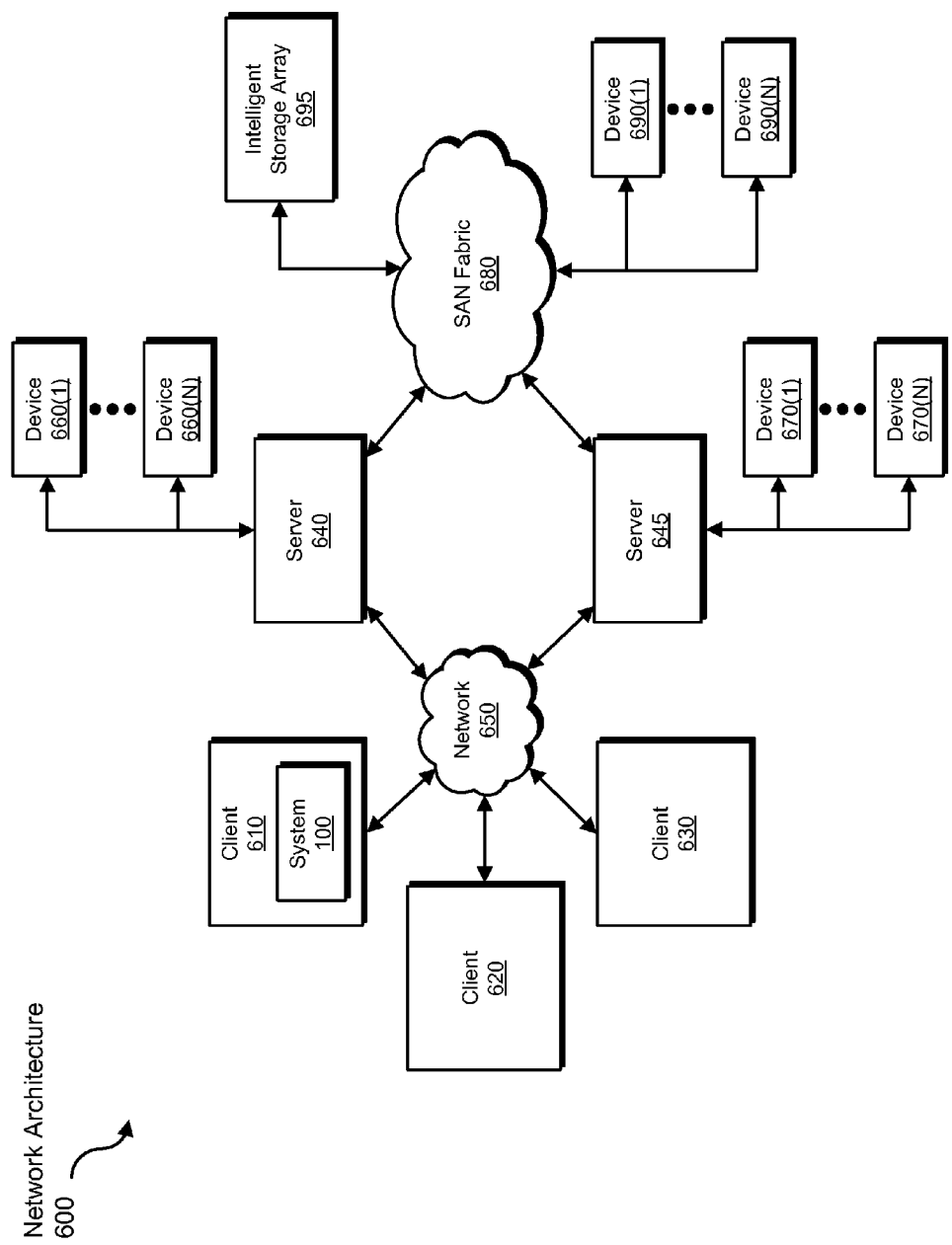
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, querying, generating, prompting, receiving, and transmitting steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for addressing security vulnerabilities on computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system capable of addressing security vulnerabilities on mobile computing systems. As another example, one or more of the modules recited herein may transform a computing display into a display including a message for addressing security vulnerabilities.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for addressing security vulnerabilities on computing devices, at least a portion of the method being performed by a computing device comprising at least one processor, the method comprising:
    assembling a security vulnerability watch list of a plurality of mobile computing devices with a security system capable of remedying security vulnerabilities;
    collecting identifications of programmatic installations on the plurality of mobile computing devices;
    storing the identifications of programmatic installations in a database indexed by the security vulnerability watch list on a storage device;
    identifying at least one security vulnerability associated with at least one programmatic installation among the programmatic installations on at least one of the mobile computing devices;
    querying, in response to identifying the security vulnerability, the database for a list of mobile computing devices that are vulnerable to the security vulnerability;
    generating a message to send to each mobile computing device within the list of mobile computing devices, the message comprising a prompt to remedy the security vulnerability;
    prompting a user of each mobile computing device within the list of mobile computing devices to remedy the security vulnerability by transmitting the message to each mobile computing device within the list of mobile computing devices via a plurality of push notifications via a telecommunication network.

2. The computer-implemented method of claim 1, wherein:
    identifying the security vulnerability associated with the programmatic installation comprises identifying malware within an application for mobile computing platforms;
    querying the database comprises querying the database for a list of mobile computing devices with the application installed.

3. The computer-implemented method of claim 2, wherein generating the message comprises generating a message that prompts the user to download a malware definition for identifying the malware within the application.

4. The computer-implemented method of claim 2, wherein generating the message comprises generating a message that prompts the user to uninstall the application.

5. The computer-implemented method of claim 1, wherein:
    identifying the security vulnerability associated with the programmatic installation comprises identifying an exploit within a firmware of a mobile computing platform;
    querying the database comprises querying the database for a list of mobile computing devices with the firmware installed.

6. The computer-implemented method of claim 5, wherein generating the message comprises generating a message prompting a user to upgrade the firmware to a secure version of the firmware.

7. The computer-implemented method of claim 1, wherein the database comprises information identifying a plurality of applications from a plurality of vendors installed on a plurality of mobile computing devices.

8. The computer-implemented method of claim 1, wherein identifying the security vulnerability associated with the programmatic installation on a mobile computing platform comprises receiving an alert from an affected mobile computing device that detected the security vulnerability associated with the programmatic installation.

9. A system for addressing security vulnerabilities on computing devices, the system comprising:
    an identification module programmed to:
        assemble a security vulnerability watch list of a plurality of mobile computing devices with a security system capable of remedying security vulnerabilities;
        collect identifications of programmatic installations on the plurality of mobile computing devices;
        store the identifications of programmatic installations in a database indexed by the security vulnerability watch list on a storage device;
        identify at least one security vulnerability associated with at least one programmatic installation among the programmatic installations on at least one of the mobile computing devices;
    a query module programmed to query, in response to identifying the security vulnerability, the database for a list of mobile computing devices that are vulnerable to the security vulnerability;
    a generation module programmed to generate a message to send to each mobile computing device within the list of mobile computing devices, the message comprising a prompt to remedy the security vulnerability;
    a prompting module programmed to prompt a user of each mobile computing device within the list of mobile computing devices to remedy the security vulnerability by transmitting the message to each mobile computing device within the list of mobile computing devices via a plurality of push notifications via a telecommunication network;
    at least one processor configured to execute the identification module, the query module, the generation module, and the prompting module.

10. The system of claim 9, wherein:
    the identification module is programmed to identify the security vulnerability associated with the programmatic installation by identifying malware within an application for mobile computing platforms;
    the query module is programmed to query the database by querying the database for a list of mobile computing devices with the application installed.

11. The system of claim 10, wherein the generation module is programmed to generate the message by generating a message that prompts the user to download a malware definition for identifying the malware within the application.

12. The system of claim 10, wherein the generation module is programmed to generate the message by generating a message that prompts the user to uninstall the application.

13. The system of claim 9, wherein:
    the identification module is programmed to identify the security vulnerability associated with the programmatic installation by identifying an exploit within a firmware of a mobile computing platform;

the query module is programmed to query the database by querying the database for a list of mobile computing devices with the firmware installed.

14. The system of claim 13, wherein the generation module is programmed to generate the message by generating a message prompting a user to upgrade the firmware to a secure version of the firmware.

15. The system of claim 9, wherein the database comprises information identifying a plurality of applications from a plurality of vendors installed on a plurality of mobile computing devices.

16. The system of claim 9, wherein the identification module is programmed to identify the security vulnerability associated with the programmatic installation on a mobile computing platform by receiving an alert from an affected mobile computing device that detected the security vulnerability associated with the programmatic installation.

17. A non-transitory computer-readable-storage medium comprising one or more computer-executable instructions that, when executed by at least one processor of a computing device, cause the computing device to:
   assemble a security vulnerability watch list of a plurality of mobile computing devices with a security system capable of remedying security vulnerabilities;
   collect identifications of programmatic installations on the plurality of mobile computing devices;
   store the identifications of programmatic installations in a database indexed by the security vulnerability watch list on a storage device;
   identify at least one security vulnerability associated with at least one programmatic installation among the programmatic installations on at least one of the mobile computing devices;
   query, in response to identifying the security vulnerability, the database for a list of mobile computing devices that are vulnerable to the security vulnerability;
   generate a message to send to each mobile computing device within the list of mobile computing devices, the message comprising a prompt to remedy the security vulnerability;
   prompt a user of each mobile computing device within the list of mobile computing devices to remedy the security vulnerability by transmitting the message to each mobile computing device within the list of mobile computing devices via a plurality of push notifications via a telecommunication network.

18. The computer-readable-storage medium of claim 17, wherein:
   the one or more computer-executable instructions cause the computing device to identify the security vulnerability associated with the programmatic installation by causing the computing device to identify malware within an application for mobile computing platforms;
   the one or more computer-executable instructions cause the computing device to query the database by causing the computing device to query the database for a list of mobile computing devices with the application installed.

19. The computer-readable-storage medium of claim 18, wherein the one or more computer-executable instructions cause the computing device to generate the message by causing the computing device to generate a message that prompts the user to download a malware definition for identifying the malware within the application.

20. The computer-readable-storage medium of claim 18, wherein the one or more computer-executable instructions cause the computing device to generate the message by causing the computing device to generate a message that prompts the user to uninstall the application.

* * * * *